UNITED STATES PATENT OFFICE.

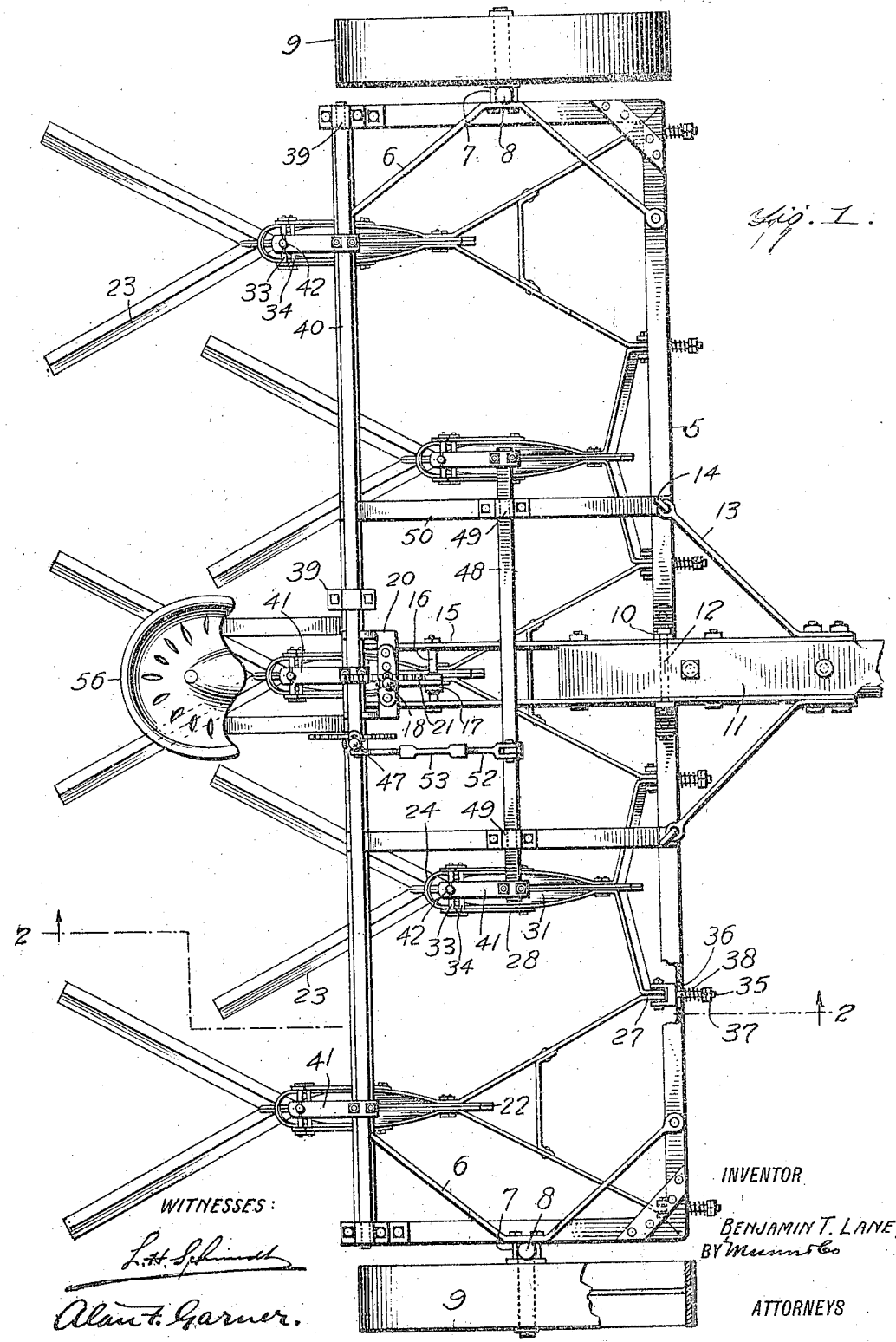

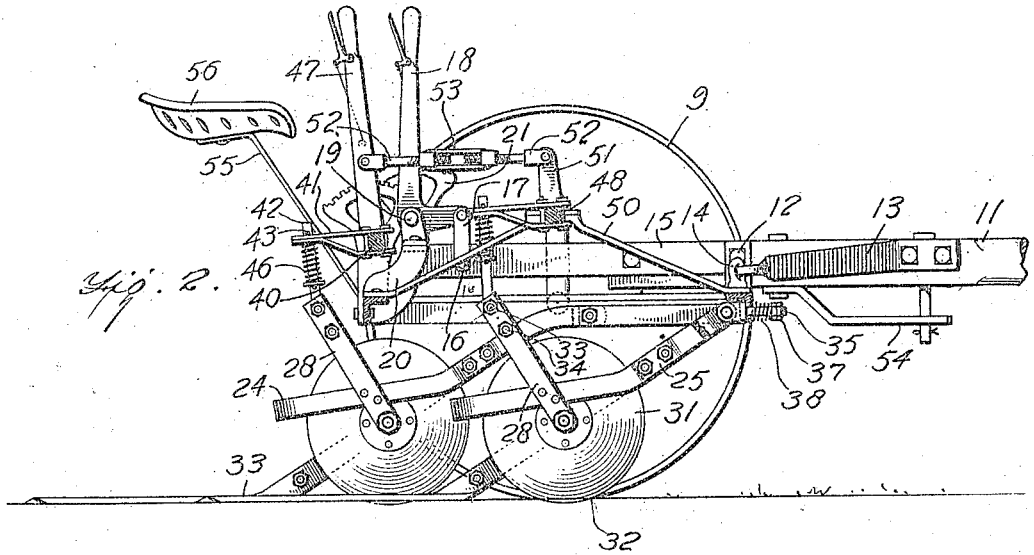
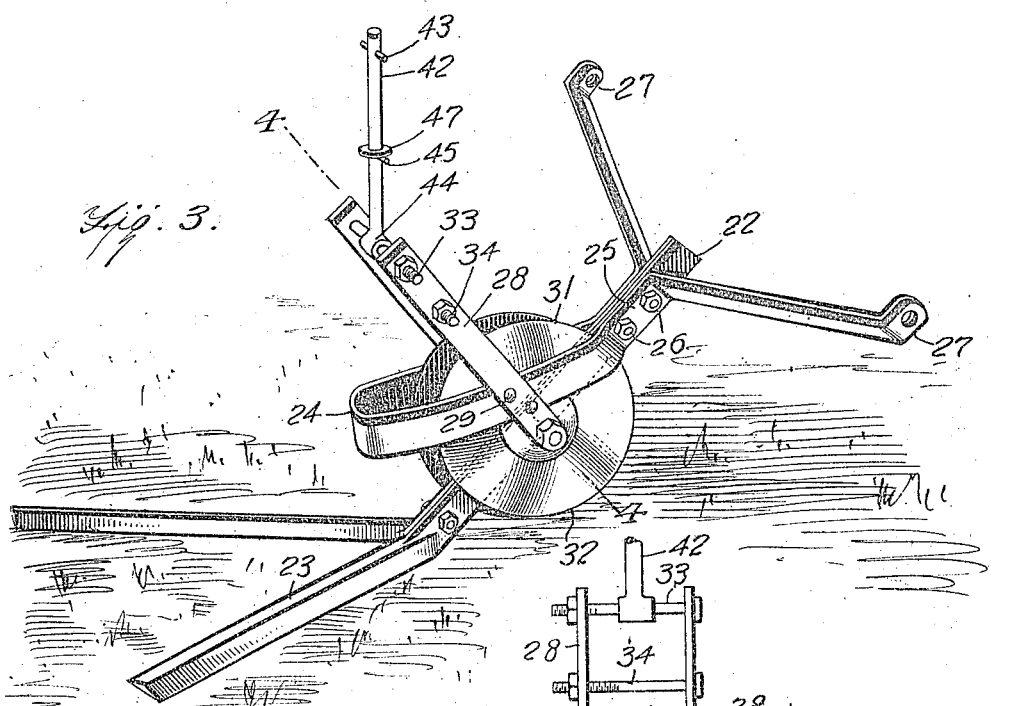
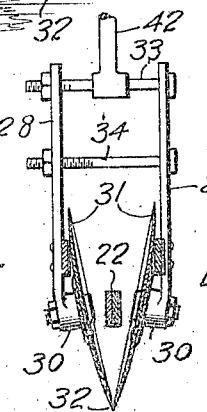

BENJAMIN THERON LANE, OF HARTLINE, WASHINGTON.

WEED-CUTTER.

1,234,352.

Specification of Letters Patent. Patented July 24, 1917.

Application filed November 26, 1915. Serial No. 63,453.

*To all whom it may concern:*

Be it known that I, BENJAMIN T. LANE, a citizen of the United States, and a resident of Hartline, in the county of Grant and State of Washington, have invented a certain new and useful Improvement in Weed-Cutters, of which the following is a specification.

One of the principal objects of my invention is to provide an improved weed cutter in which the cutting blades are adjustably connected to a frame, which latter is bodily adjustable, whereby the height and angular relation of the cutting blades with the ground may be readily changed and correctly maintained.

A further object of the invention is to provide an improved weed cutting machine in the nature of a plurality of sets of cutting blades carried by frames adjustably connected to a main frame, the latter being provided with ground wheels for supporting it and being pivotally connected with the draft bar of the machine to be adjusted relatively to the same, the frames on which the cutting blades are carried being provided with colters arranged in advance of the blades for opening slight furrows and preventing the blades from clogging, said colters adapted to maintain the blades at proper heights above the ground when the colters are engaged therewith.

A further object of the invention is to provide a device of the class described which will be comparatively simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawings in which like characters of reference indicate like parts throughout the several figures, of which—

Figure 1 represents a top plan view of a weeding machine constructed according to my invention.

Fig. 2 represents a view in section taken vertically and longitudinally thereof on the plane indicated by the line 2—2 of Fig. 1 looking in the direction indicated by the arrow.

Fig. 3 represents a view in perspective of one set of cutting elements including the cutting blades and frame to which they are connected and the colters carried by the frame.

Fig. 4 represents a view in section taken on the plane indicated by the line 4—4 of Fig. 3.

In carrying out my invention, I provide a rectangular main frame 5 preferably formed of angle iron having angular braces 6 arranged at its ends, which braces carry clips 7 to which the vertical arms of right angular axles 8 are secured, the horizontal arms of said axles rotatably supporting flanged ground wheels 9. In assembling the machine either of the arms of the axles may have the wheels journaled thereon, and the other arms will be arranged vertically and connected with the clips. When the arms to which the ground wheels are originally journaled, become worn, the axles may be reversed and the wheels placed upon the unworn arms.

Centrally of its forward bar, the frame is provided with spaced angles 10 whose upwardly extending arms are arranged on opposite sides of a draw bar 11, and through which bar and arms a bolt 12 extends, for pivotally connecting the frame with the draw bar. Braces 13 carried by the draft bar forwardly of the frame, extend rearwardly in divergent relation and are provided at their rear ends with eyes engaging in eye-bolts 14 carried by the forward bar of the frame, thus providing a loose connection, whereby to allow adjustment of said frame, and at the same time not interfere with the operation of the arms 13 in bracing the frame against undue twisting movement relative to the draw bar. Carried on each side of the draw bar 11 and extending rearwardly, are spaced plates 15 which, adjacent their rear ends, carry a bolt 16 on which the lower end of a link 17 is pivoted. The upper end of said link is pivotally connected to the forwardly extending arm of a bell crank lever 18, which lever is pivotally supported at 19 upon a bracket 20 carried on the rear longitudinal bar of frame 5. The usual dog and segment mechanism 21 is provided to retain the lever 18 in adjusted position. By moving this lever forwardly the frame will be moved upwardly upon its pivot, and by moving the lever rearwardly the frame will be lowered upon its pivot.

The cutters are arranged in sets of two blades each, the sets being disposed in staggered relation transversely of the machine, as indicated in Fig. 1. Each cutter includes a pair of strips of metal 22 secured together by means of bolts or other suitable devices, and having their lower ends bent in angular relation to the strips and bent outwardly in angular relation to each other as indicated, said lower ends having their front and rear edges sharpened whereby to provide double-edged blades 23. These blades, as will be noted, are arranged substantially at angles of about 45° to each other, and converge toward their forward ends. The cutters in each set are carried by a frame formed preferably of a single strip of metal bent upon itself centrally to form a loop 24, and then bent inwardly and upwardly as at 25 and connected by means of bolts or other devices 26 to the plates 22 near the upper ends of the latter, the end portions of the strip being then bent outwardly to diverge as indicated in Fig. 3, and are finally bent forwardly as at 27 and perforated to form eyes. The loop 24, it will be noted, is arranged at a less inclination to the horizontal than are the upper portions of plate 22, and it is disposed above the forward portions of blades 23. To the sides of this loop are secured rearwardly and upwardly extending spaced plates 28 by means of rivets or other suitable means 29, the lower ends of the plates extending slightly below the loop and being provided with hubs 30 receiving axles on which disk colters 31 are carried, each plate supporting one of the colters. The colters are arranged in spaced relation to each other and converge downwardly and forwardly to substantially touch at the point 32, see Fig. 4, which point corresponds with the point in the periphery of the colters which first engages with the ground. The strips 22 which may be broadly termed the shank on which the cutting blades 23 are carried, extend as indicated between the colters 31. The plates 28 are connected together near their upper ends by bolts or other suitable devices 33 and 34 respectively arranged one above the other, as shown. The bolt 34 is primarily intended to be used in adjusting the plates 28 toward and away from each other, whereby to properly position the colters 31 relative to each other. To secure this adjustment the side bars of the loop 24 are to a certain extent flexible, so that the slight adjustment necessary may be made, said side portions of the loop being twisted in one direction or another to allow of the adjustment. Of course the openings in the plate 28 through which the bolts 33 and 34 pass are slightly larger than the bolts to allow for the play necessary in obtaining the correct adjustments of the colters.

The eyes 27 provided on the frames with which the colters and cutters are connected, are pivoted between the bifurcated rear ends of bolts 35 carried by the front bar of frame 5. These bolts are arranged at spaced intervals along the frame and as indicated in Fig. 1, extend each through a slot 36, and are provided at their forward ends with nuts 37 between which and the front bar of the frame are arranged coiled springs 38 whereby to cushion the bolts for absorbing the shocks incident to the engagement of the cutters with stones or other obstructions in their pathway. The bolts are arranged to extend through the slots, whereby they may have lateral movement in order that lateral movement of the cutter blades may be allowed in passing roots, stumps, and similar obstructions. As indicated in Fig. 1, each bolt 35 has connected to it the adjacent arms of a pair of the cutter supporting frames. In order that the sets of cutters when the machine is finally assembled may be arranged in staggered relation across the machine, the arms of the alternate cutter supporting frames are shortened as indicated in Fig. 1, thus positioning alternate cutters in advance of the rest.

Arranged above the rear bar of frame 5 and journaled in brackets 39 carried thereby, is a square rod 40, said rod being rounded at the points where it extends through the brackets. Arranged upon the rod at spaced intervals are rearwardly extending arms 41 formed each of a pair of plates lying at their forward ends one above and one below the rod and secured thereto by means of bolts connecting the plates, the rear ends of said plates being brought together by bending the lower plate upwardly as indicated. Each of these arms is provided with an opening through which a substantially vertically extending rod 42 extends, said rod being provided with a transverse pin 43 arranged above the arms to prevent loss of the rod from said arms. The lower end of each rod 42 is provided with an eye 44 through which a bolt 33 of one of the cutter frames extends. Below the arm 41, the rod 42 is provided with a second transverse pin 45 supporting a disk 47 arranged upon the rod, and between said disk and the arm is interposed a coiled spring 46. This spring is adapted to normally retain the rod at the lowermost point of its path of movement through the arm, and is adapted to cushion the vibration caused by the upward and downward movement of the colters and cutter blades in passing over humps and uneven surfaces of the ground. Connected with the bar 40 is an upwardly extending lever 47 having the usual dog and segment for retaining the lever in adjusted position. By shifting this lever forwardly, the shaft 40 will be rocked whereby to raise arm 41, and thus raise the cutters and colters upon their pivots and the reverse movement of the lever will cause the devices to be lowered. The bar 40 is connected with and actuates only the rear set of cutters, and in order that the forward set of cutters may be actuated, there is provided a second squared rod 48 which is arranged substantially midway between the front and rear bars of frame 5, and which is provided with rounded portions journaled in brackets 49 carried each by one of the longitudinally extending supports 50. The latter as shown clearly in Fig. 1, are arranged one on each side of the central portion of frame 5, in spaced relation to each other, and at their ends are secured to the front and rear bars of said frame. These supports 50 are substantially in the shape of inverted V-shaped braces upon whose central and highest portions the bearings 49 are supported. Carried on the ends of bar or rod 48 are additional arms 41 which are connected with the forward set of cutters in the same manner as that already described in connection with the rear set of cutters. Secured to and extending upwardly from the shorter rock shaft 48, is an arm 51, said arm being arranged directly in advance of the lever 47. Threaded rods 52 carried one by the arm 51 and the other by the lever 47, are connected by a turn buckle 53, whereby the rock shafts 40 and 48 may be adjusted relatively to each other in order to secure an analogous adjustment of the forward and rear sets of cutters, or a different adjustment thereof, as the case may be.

Arranged on the under side of the draft bar 11 in advance of the frame 5, is a hitch 54 to which a doubletree may be connected. A standard 55 is carried on the rear portion of frame 5, and supports a seat 56 for the driver of the vehicle, the levers 47 and 18 being arranged in relation with the seat to be conveniently manipulated by the driver of the vehicle.

It will be noted that when the lever 4 is manipulated, both the rock shafts 48 and 40 will be simultaneously operated, and to the same extent.

Although I have described the preferred embodiment of my invention, I may desire to make such changes in the construction, combination, and arrangement of parts thereof, as do not depart from the spirit of the invention and the scope of the appended claims.

I claim:

1. A weeding machine including a cutter frame, said cutter frame comprising a loop having forwardly extending arms, a shank engaged between the arms and arranged below the loop, disk colters arranged within the loop and converging forwardly and downwardly, means for adjusting the colters toward and away from each other, cutter blades carried by the shank rearwardly of the colters, plates carried by the loop and extending upwardly and rearwardly therefrom, and means connected with the plates whereby the frame may be adjusted relatively to a machine to which it is attached.

2. In a weeding machine, a cutter frame including a loop having flexible sides, cutting blades supported by the loop, plates connected each to one of the sides of the loop, disk colters carried by the plates within the loop, said colters converging downwardly and forwardly, and a bolt connecting the plates and adapted to be operated for moving them toward and away from each other whereby to adjust the colters relatively to each other.

3. In a weeding machine, a supporting frame including a loop having flexible sides, plates carried by the sides of the loop, colters carried by the plates, a cutter blade supported by the loop, and means for adjusting the plates toward and away from each other whereby to adjust the colters relatively to each other.

4. In a weed cutting machine, a supporting frame including a loop having flexible sides, plates carried by the sides of the loop, colters connected with the plates, and means connecting the plates whereby they may be adjusted toward and away from each other whereby to adjust the colters relatively to each other.

5. In a weed cutting machine, a supporting frame, a shank carried thereby, rearwardly diverging cutting blades carried by the shank, disk colters carried by the frame and converging forwardly and downwardly, said colters being arranged in front of said cutting blades, and means whereby said colters may be adjusted toward and away from each other.

6. A weed cutting machine, including a pair of rearwardly diverging cutting blades, a pair of downwardly converging disks arranged in advance of the cutting blades, and means whereby the disks may be adjusted toward and away from each other.

7. In a weed cutting machine, the combination with a substantially V-shaped cutting blade, of a pair of disks converging to a point in advance of the apex of the cutting blade, and means whereby the disks may be adjusted toward and away from each other.

8. In a weed cutting machine, a supporting frame, a pair of rearwardly diverging cutting blades carried by the frame, a pair of colters arranged in advance of the cutting blades and converging downwardly and forwardly, and means whereby the colters may be adjusted toward and away from each other.

9. In a weed cutting machine, a cutter supporting frame including a loop, a shank carried by the loop and extending rearwardly and downwardly therefrom, a pair of rearwardly diverging cutting blades carried by the shank and having front and rear sharpened edges, and colters arranged within the loop and one on each side of the shank.

BENJAMIN THERON LANE.

Witnesses:
 MARTHA PERRY,
 ETHEL L. PROBSTFELD.

Copies of this patent may be obtained for five cents each, by addressing the "Commissioner of Patents, Washington, D. C."